(12) United States Patent
Cavanagh

(10) Patent No.: US 6,655,349 B1
(45) Date of Patent: Dec. 2, 2003

(54) SYSTEM FOR CONTROLLING A VARIABLE VALVE ACTUATION SYSTEM

(75) Inventor: Mark S. Cavanagh, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/331,165

(22) Filed: Dec. 30, 2002

(51) Int. Cl.[7] .............................................. F02D 13/04
(52) U.S. Cl. .................................... 123/321; 123/90.16
(58) Field of Search .............................. 123/321, 90.16, 123/319, 322, 90.15

(56) References Cited

U.S. PATENT DOCUMENTS

| | | |
|---|---|---|
| 4,869,222 A | 9/1989 | Klassen |
| 5,255,637 A | 10/1993 | Schechter |
| 5,576,963 A | 11/1996 | Ribbens et al. |
| 5,619,965 A * | 4/1997 | Cosma et al. .............. 123/322 |
| 6,021,758 A | 2/2000 | Carey et al. |
| 6,237,551 B1 | 5/2001 | Macor et al. |

* cited by examiner

Primary Examiner—Bibhu Mohanty
(74) Attorney, Agent, or Firm—Finnegan, Henderson, Farabow, Garrett & Dunner

(57) ABSTRACT

A method of controlling a valve actuation system is provided. An intake cam assembly is operated to move an intake valve between a first position and a second position. An exhaust cam assembly is operated to move an exhaust valve between a first position a second position. An engine brake is operated to selectively move the exhaust valve from the first position towards the second position when a piston is at or near a top-dead-center position of a compression stroke. At least one operating parameter of the engine is sensed. A desired intake valve actuation period is determined based on the at least one operating parameter. A valve actuator is engaged with the intake valve to prevent the intake valve from returning to the first position in response to operation of the intake cam assembly. The valve actuator is released to allow the intake valve to return to the first position at the end of the determined valve actuation period.

20 Claims, 7 Drawing Sheets

SYSTEM FOR CONTROLLING A VARIABLE VALVE ACTUATION SYSTEM

TECHNICAL FIELD

The present invention is directed to a variable valve actuation system and, more particularly, to a system and method for controlling a variable valve actuation system to operate an engine.

BACKGROUND

Emission reductions and fuel efficiency are competing concerns in the design and operation of an internal combustion engine, such as, for example, a diesel, gasoline, or natural gas engine. Accordingly, a significant amount of research and development work is being directed towards reducing the emissions while maintaining or improving the fuel efficiency of these types of engines. Any increase in fuel efficiency will directly translate to a reduction in the fuel costs associated with operating the engine along with the production of carbon dioxide.

Oxides of nitrogen ("NOx") are one constituent of engine emissions that researchers are trying to reduce. NOx production is generally proportional to temperatures of combustion and volume of excess air. However, fuel efficiency is also generally proportional to these same factors. Conventional NOx reduction techniques include increasing the mass of inert matter, such as water or recirculated exhaust gas, in a combustion chamber prior to combusting a fuel and air mixture. These measures may reduce the combustion temperatures and the generation of NOx, but may also reduce the fuel efficiency.

One approach to compensate for a reduction in fuel efficiency involves increasing the pressure of the intake air provided to the engine and improving control over the flow of gases into and out of the engine. This may be accomplished by placing a turbocharger in the intake air flow path and by modifying the typical engine valve actuation system to provide flexibility in the actuation timing of the intake and exhaust valves. In this manner, the flow of gases to and from the engine may be tailored to meet the particular operating conditions of the engine and thereby improve the fuel efficiency of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation.

An engine may, however, include a variable valve actuation system, such as described in U.S. Pat. No. 6,237,551 to Macor et al., issued on May 29, 2001. In this type of system, the cam arrangement is configured to hold the engine valves open for a certain period of time and an auxiliary valve is included to selectively disengage the cam assembly. This allows the engine valves to be closed earlier than provided by the timing of the cam assembly and improves the control over valve actuation timing.

The improved control provided by a variable valve actuation system may allow for gains in fuel efficiency. The variable valve actuation system may be operated to selectively implement a variation on the typical diesel or Otto cycle during the operation of the engine. For example, the intake valves may be controlled to implement a "late intake" type Miller cycle. In a late intake Miller cycle, the intake valves are opened for the intake stroke and held open for a portion of the compression stroke of the piston.

In addition, the exhaust valves may be controlled to implement an engine braking cycle. In an engine braking cycle, the exhaust valves are opened when the piston approaches a top-dead-center position of the compression stroke to release the air compressed during the combustion stroke. By releasing the compressed air instead of initiating combustion, the engine is operated as an air compressor instead of a power generator. In this manner, the engine may be operated to dissipate the kinetic energy of a moving vehicle to help slow the vehicle.

When, however, a turbocharger provides pressurized air to the internal combustion engine, a variation from the cam driven valve actuation timing may result in excessive compression ratios in the combustion chambers. If the maximum compression ratio in the combustion chambers consistently exceeds a certain level, the high compression ratios may damage any of several engine components. For example, the high compression ratios may damage the valve actuation assembly and/or the engine braking components. In addition, the high compression ratios may damage the engine gasket. This type of damage may result in expensive and time-consuming maintenance to repair.

The system and method of the present invention solves one or more of the problems set forth above.

SUMMARY OF THE INVENTION

In one aspect, the present invention is directed to a method of controlling a valve actuation system for an engine. An intake cam assembly is operated to move an intake valve between a first position where the intake valve blocks a flow of fluid relative to a cylinder and a second position where the intake valve allows a flow of fluid relative to the cylinder. An exhaust cam assembly is operated to move an exhaust valve between a first position where the exhaust valve blocks a flow of fluid and a second position where the exhaust valve allows a flow of fluid. An engine brake is operated to selectively move the exhaust valve from the first position towards the second position when a piston is at or near a top-dead-center position of a compression stroke. At least one operating parameter of the engine is sensed. A desired intake valve actuation period is determined based on the at least one operating parameter. A valve actuator is engaged with the intake valve to prevent the intake valve from returning to the first position in response to operation of the intake cam assembly. The valve actuator is released to allow the intake valve to return to the first position at the end of the determined valve actuation period.

In another aspect, the present invention is directed to an intake valve actuation system for an engine that includes an intake valve moveable between a first position where the intake valve prevents a flow of fluid and a second position where the intake valve allows a flow of fluid. An intake cam assembly is connected to the intake valve to move the intake valve between the first position and the second position. An exhaust valve is moveable between a first position where the exhaust valve prevents a flow of fluid and a second position where the exhaust valve allows a flow of fluid. An exhaust cam assembly is connected to the exhaust valve to move the exhaust valve between the first position and the second position. A brake actuator is selectively operable to engage the exhaust valve to move the exhaust valve from the first position towards the second position. A valve actuator is selectively operable to engage the intake valve and prevent the intake valve from returning to the first position. A sensor is operable to sense an operating parameter of the engine. A controller is operable to determine a valve actuation period based on the sensed operating parameter of the engine and to actuate the valve actuator to prevent the intake valve from returning to the first position for the determined valve actuation period.

DETAILED DESCRIPTION

Figure 1:
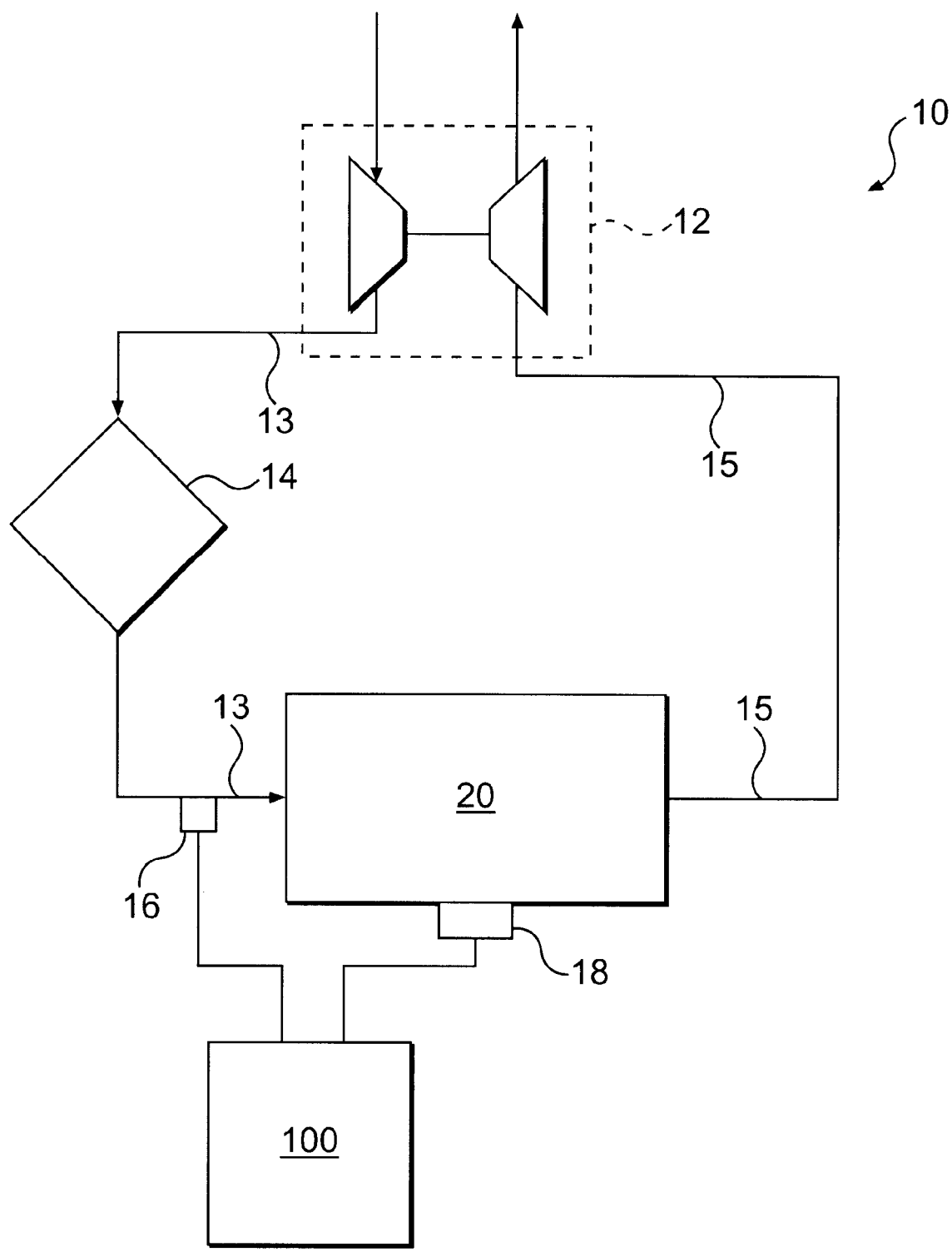
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may include various components, such as, for example, one or more turbochargers 12 and an aftercooler 14. An exhaust air passageway 15 may lead from engine 20 to turbocharger 12.

Figure 2:
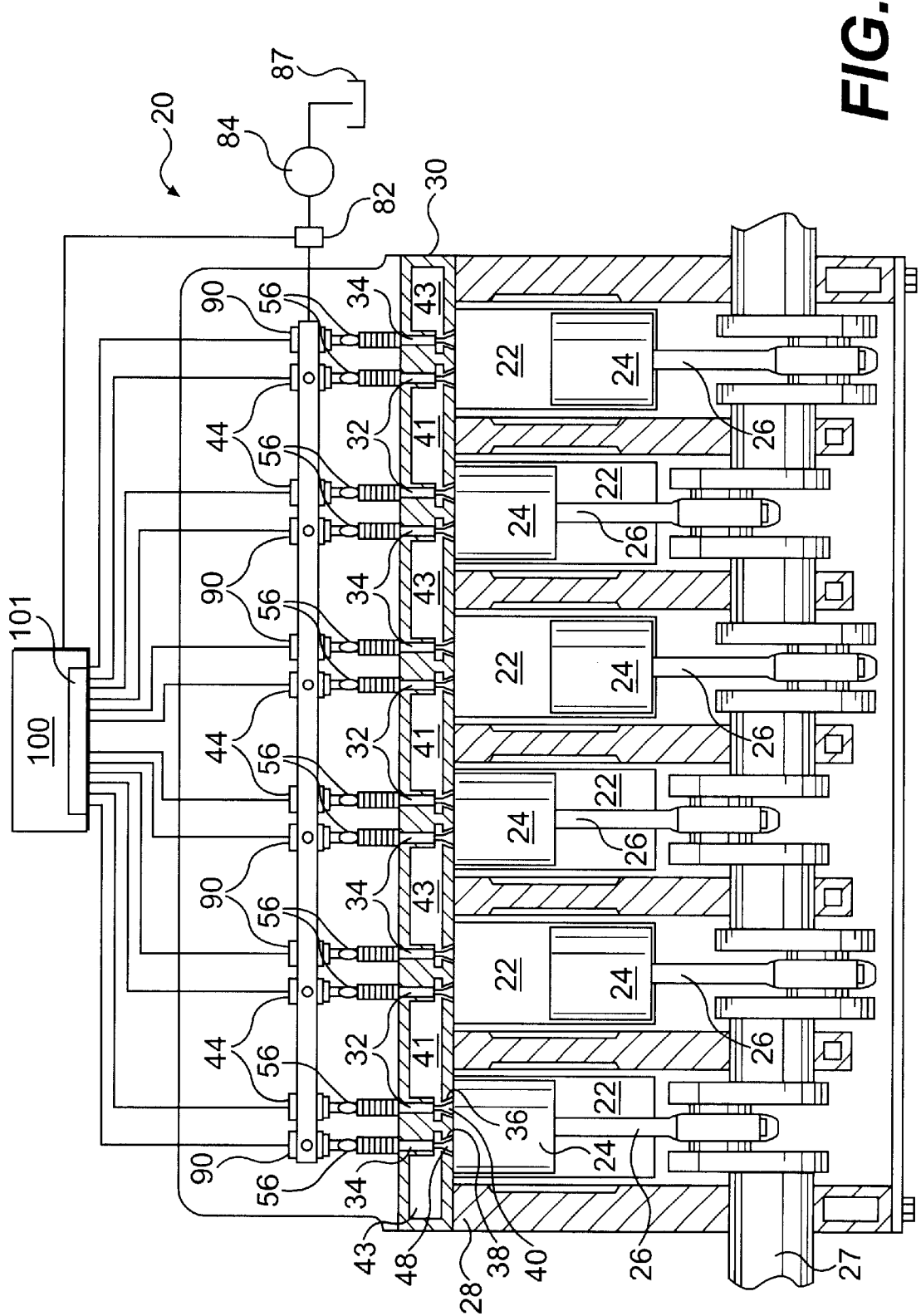
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is disposed for sliding movement between a top dead center position and a bottom dead center position within each cylinder 22. In the illustrated embodiment, engine 20 includes six cylinders 22 and six associated pistons 24. One skilled in the art will recognize that engine 20 may include a greater or lesser number of pistons 24 and that pistons 24 may be disposed in an "in-line" configuration, a "V" configuration, or any other conventional configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3A:
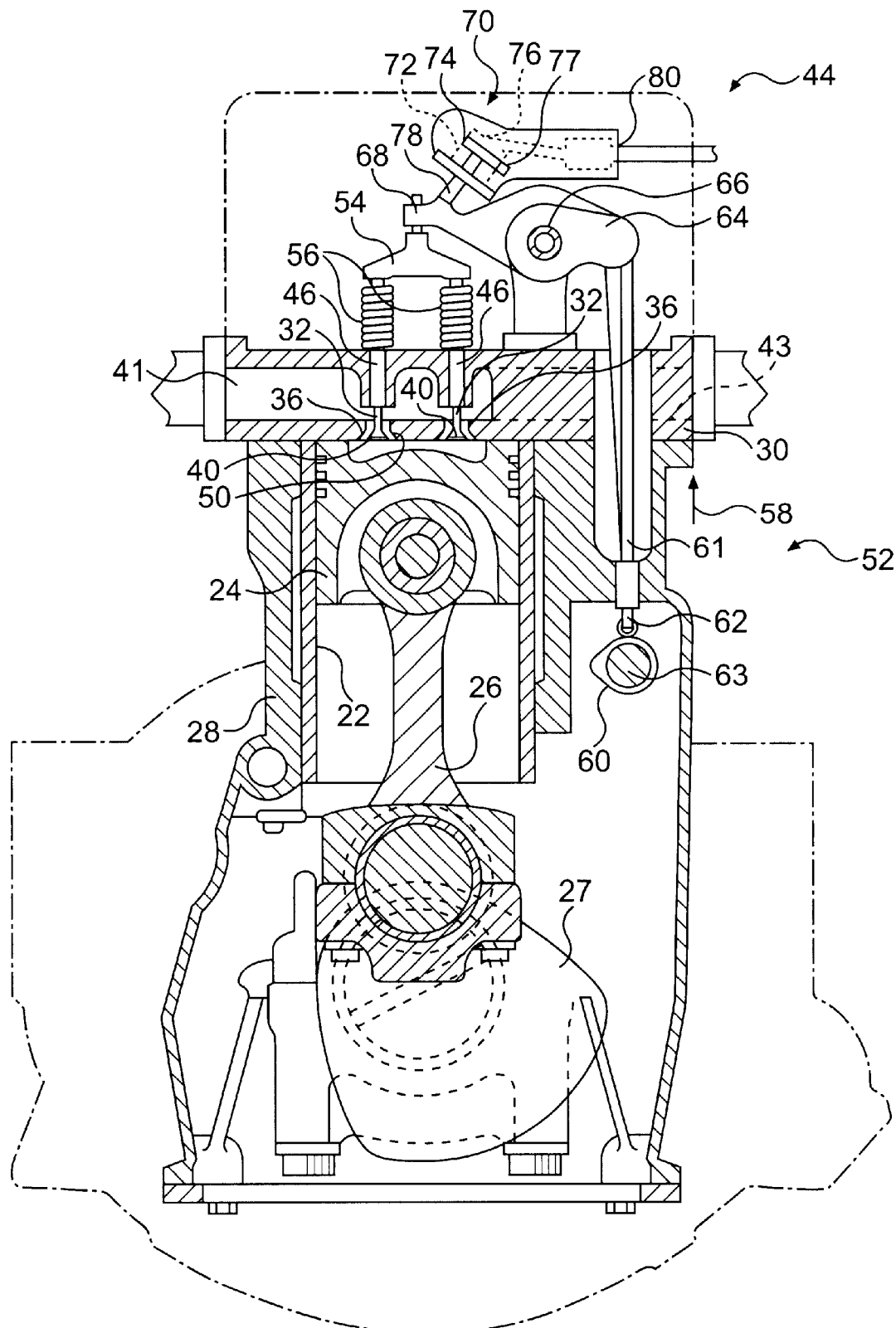
FIG. 3a is a diagrammatic cross-sectional view of a cylinder and an intake valve actuation assembly in accordance with an exemplary embodiment of the present invention.

As shown in FIG. 3a, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Figure 3B:
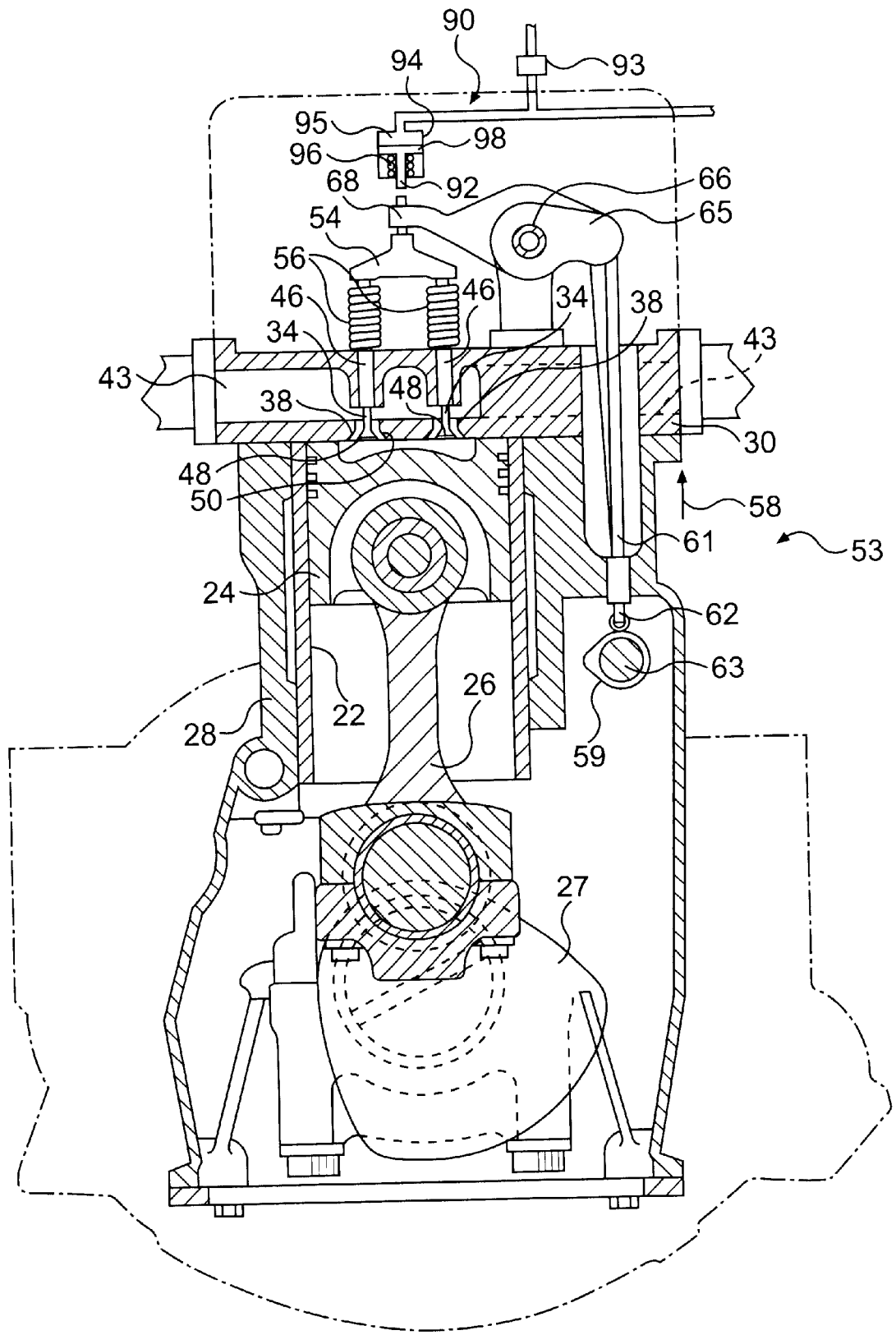
FIG. 3b is a diagrammatic cross-sectional view of a cylinder and an exhaust valve actuation assembly in accordance with an exemplary embodiment of the present invention.

As shown in FIG. 3b, cylinder head 30 defines a pair of exhaust ports 38 connecting cylinder 22 with exhaust passageway 43. Each exhaust port 38 includes a valve seat 50. One exhaust valve 34 is disposed within each exhaust port 38. A valve element 48 of each exhaust valve 34 is configured to engage valve seat 50. When exhaust valve 34 is in a closed position, valve element 48 engages valve seat 50 to close exhaust port 38 and block fluid flow relative to cylinder 22. When exhaust valve 34 is lifted from the closed position, exhaust valve 32 allows a flow of fluid relative to cylinder 22.

As shown in FIG. 2, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valves 32 from a first, or closed, position to a second, or open, position.

Engine 20 may also include a series of engine brake assemblies 90. One engine brake assembly 90 may be operatively associated with each pair of exhaust valves 34 for each cylinder 22. Each engine brake assembly 90 is operable to move or "lift" the associated exhaust valves 34 from a first, or closed, position to a second, or open, position.

In the exemplary embodiments of FIG. 3a and 3b, each pair of intake valves 32 and exhaust valves 34 are connected with a bridge 54. Each bridge 54 is connected to the respective valve element 40 and 48 through a pair of valve stems 46. A spring 56 may be disposed around each valve stem 46 between cylinder head 30 and bridge 54. Spring 56 acts to bias valve elements 40 and 48 into engagement with the respective valve seat 50 to thereby close each intake port 36 and exhaust port 38.

As shown in FIG. 3a, a rocker arm 64 may be engaged with bridge 54 that joins intake valves 32 and, as shown in FIG. 3b, a rocker arm 65 may be engaged with bridge 54 that joins exhaust valves 43. One end of each rocker arm 64 and 65 is adapted to engage the respective bridge 54. Each rocker arm 64 and 65 is adapted to pivot about a pivot 66 to thereby move the respective bridge 54 and lift the associated valves.

As shown in FIG. 3a, an intake cam assembly 52 is connected to rocker arm 64 to actuate intake valves 32. A push rod 61 having a cam follower 62 is adapted to engage an intake cam 60 having a cam lobe. Intake cam 60 is mounted on a cam shaft 63.

As shown in FIG. 3b, an exhaust cam assembly 53 is connected to rocker arm 65 to actuate exhaust valves 34. A push rod 61 having a cam follower 62 is adapted to engage an exhaust cam 59 having a cam lobe. Exhaust cam 59 is also mounted on cam shaft 63.

A rotation of cam shaft 63 drives the actuation of intake valves 32 and exhaust valves 34. Cam shaft 63 is connected to crankshaft 27 so that a rotation of crankshaft 27 causes a corresponding rotation of cam shaft 63. Cam shaft 63 may be connected to crankshaft 27 through any means readily apparent to one skilled in the art, such as, for example, through a gear reduction assembly (not shown). As one skilled in the art will recognize, a rotation of cam shaft 63 will cause each cam follower 62 and associated push rod 61 to periodically reciprocate between an upper and a lower position.

The reciprocating movement of each push rod 61 causes rocker arms 64 and 65 to pivot about pivot 66. When push rods 61 move in the direction indicated by arrow 58, rocker arms 64 and 65 will pivot and move the respective bridge 54 in the opposite direction. The movement of each bridge 54 will cause the corresponding intake valves 32 or exhaust valves 34 to lift and open intake ports 36 or exhaust ports 38. As cam shaft 63 continues to rotate, springs 56 will act on each bridge 54 to return intake valves 32 and exhaust valves 34 to the closed position. One skilled in the art will recognize that both intake cam assembly 52 and exhaust cam assembly 53 may have other configurations, such as, for example, where cams 59 and 60 act directly on rocker arms 64 and 65.

The shape and orientation of intake cam 60 will control the timing of the actuation of intake valves 32 and the shape and orientation of exhaust cam 59 will control the timing of exhaust valves 34. As one skilled in the art will recognize, intake and exhaust cams 60 and 59 may be configured to coordinate the valve actuation with the movement of piston 24. For example, intake valves 32 may be actuated to open intake ports 36 when piston 24 is moving from a top-dead-center position to a bottom-dead-center position in an intake stroke to allow air to flow from intake passageway 41 into cylinder 22. Exhaust valves 34 may be actuated to open exhaust ports 38 when piston 24 is moving from a bottom-dead-center position to a top-dead-center position in an exhaust stroke to allow exhaust gases to flow from cylinder 22 to exhaust passageway 43.

As shown in FIG. 3b, engine brake assembly 90 may be adapted to engage end 68 of rocker arm 64 connecting exhaust valves 38. Engine brake assembly 90 includes a piston 98 disposed in a housing 94 to define a chamber 95. A push rod 92 is connected to piston 98 and is adapted to move with piston 98. A spring 96 may be disposed between housing 94 and piston 98. Spring 96 acts on piston 98 to move push rod 92 away from end 68 of rocker arm 64. It should be noted that engine brake assembly 90 may have any configuration readily apparent to one skilled in the art.

A fluid line 91 provides a fluid pathway to chamber 95. The introduction of pressurized fluid into chamber 95 moves piston 98 and push rod 92 towards end 68 of rocker arm 64. Push rod 92 engages end 68 of rocker arm 64 to pivot rocker arm 64 and thereby lift exhaust valves 38 from valve seats 50. The engine brake assembly 90 may be used to open exhaust valves 38 when piston 24 is at or near a top-dead-center position of a compression stroke.

The introduction of pressurized fluid into chamber 95 may be controlled in any manner readily apparent to one skilled in the art. For example, piston 98 may be connected to a master piston (not shown) through fluid line 91. A valve 93 may be connected to fluid line 91. When valve 93 is closed, a hydraulic lock is created between the master piston and piston 98. Thus, a motion of the master piston will cause a corresponding movement of piston 98. The master piston may be driven by a cam such as, for example, a fuel injection cam. One skilled in the art will recognize that other methods for driving the master piston may also be used.

As shown in FIG. 3a, valve actuation assembly 44 also includes a valve actuator 70. In the illustrated exemplary embodiment, valve actuator 70 is hydraulically actuated. It should be understood that valve actuator 70 may be actuated through other types of systems, such as for example, electronic solenoids or other hydraulic systems.

In the illustrated exemplary embodiment, valve actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
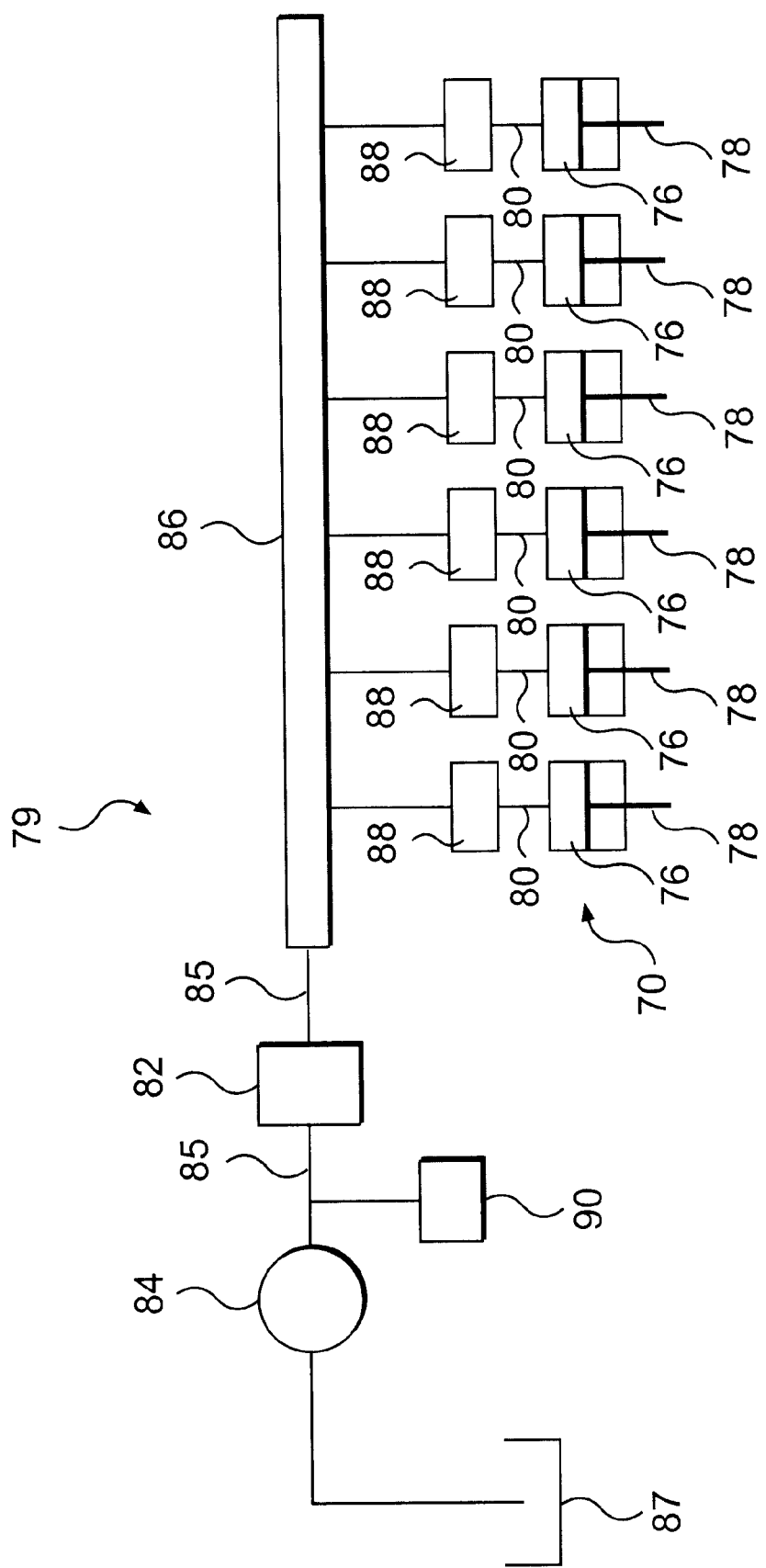
FIG. 4 is a schematic and diagrammatic representation of a fluid supply system for a hydraulic actuator for an engine valve in accordance with an exemplary embodiment of the present invention.

As illustrated in FIGS. 2 and 4, a source of hydraulic fluid 84 is provided to draw fluid from a tank 87 and to supply pressurized fluid to valve actuator 70. Source of hydraulic fluid 84 may be part of a lubrication system, such as typically accompanies an internal combustion engine. Such a lubrication system may provide pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

A fluid supply system 79 connects source of hydraulic fluid 84 with valve actuator 70. In the exemplary embodiment of FIG. 4, source of hydraulic fluid 84 is connected to a fluid rail 86 through fluid line 85. A control valve 82 is disposed in fluid line 85. Control valve 82 may be opened to allow pressurized fluid to flow from source of hydraulic fluid 84 to fluid rail 86. Control valve 82 may be closed to prevent pressurized fluid from flowing from source of hydraulic fluid 84 to fluid rail 86.

As illustrated in FIG. 4, fluid rail 86 supplies pressurized fluid from source of hydraulic fluid 84 to a series of valve actuators 70. Each valve actuator 70 may be associated with a pair of intake valves 32 for a particular engine cylinder 22 (referring to FIG. 1). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will also recognize that fluid supply system 79 may have a variety of different configurations and include a variety of different components. For example, fluid supply system 79 may include a check valve placed in parallel with directional control valve 88 between control valve 82 and hydraulic actuator 70. In addition, fluid supply system 79 may include a source of high pressure fluid. Fluid supply system 79 may also include a snubbing valve to control the rate of fluid flow from hydraulic actuator 70 and a damping system, which may include an accumulator and a restricted orifice, to prevent pressure oscillations in actuator chamber 76 and fluid line 80.

As shown in FIG. 2, a controller 100 is connected to each engine brake assembly 90, each valve actuation assembly 44, and to control valve 82. Controller 100 may include an electronic control module that has a microprocessor and a memory 101. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control engine braking assembly 90, valve actuation assembly 44, the fuel injection system, and any other engine function commonly controlled by an electronic control module. Controller 100 may control engine 20 based on the current operating conditions of the engine and/or instructions received from an operator.

Controller 100 may control engine brake assembly 90 by transmitting a signal to valve 93 (referring to FIG. 3b). The signal may be, for example, a current that causes valve 93 to close to thereby form a hydraulic lock between piston 98 and the master piston (not shown) to activate an engine braking mode. In the engine braking mode, engine brake assembly 90 may open exhaust valves 34 each time piston 24 is at or near a top-dead-center position of a compression stroke. Controller 100 may disengage the engine braking mode by opening valve 93 to thereby disrupt the hydraulic lock between piston 98 and the master piston (not shown).

Figure 5:
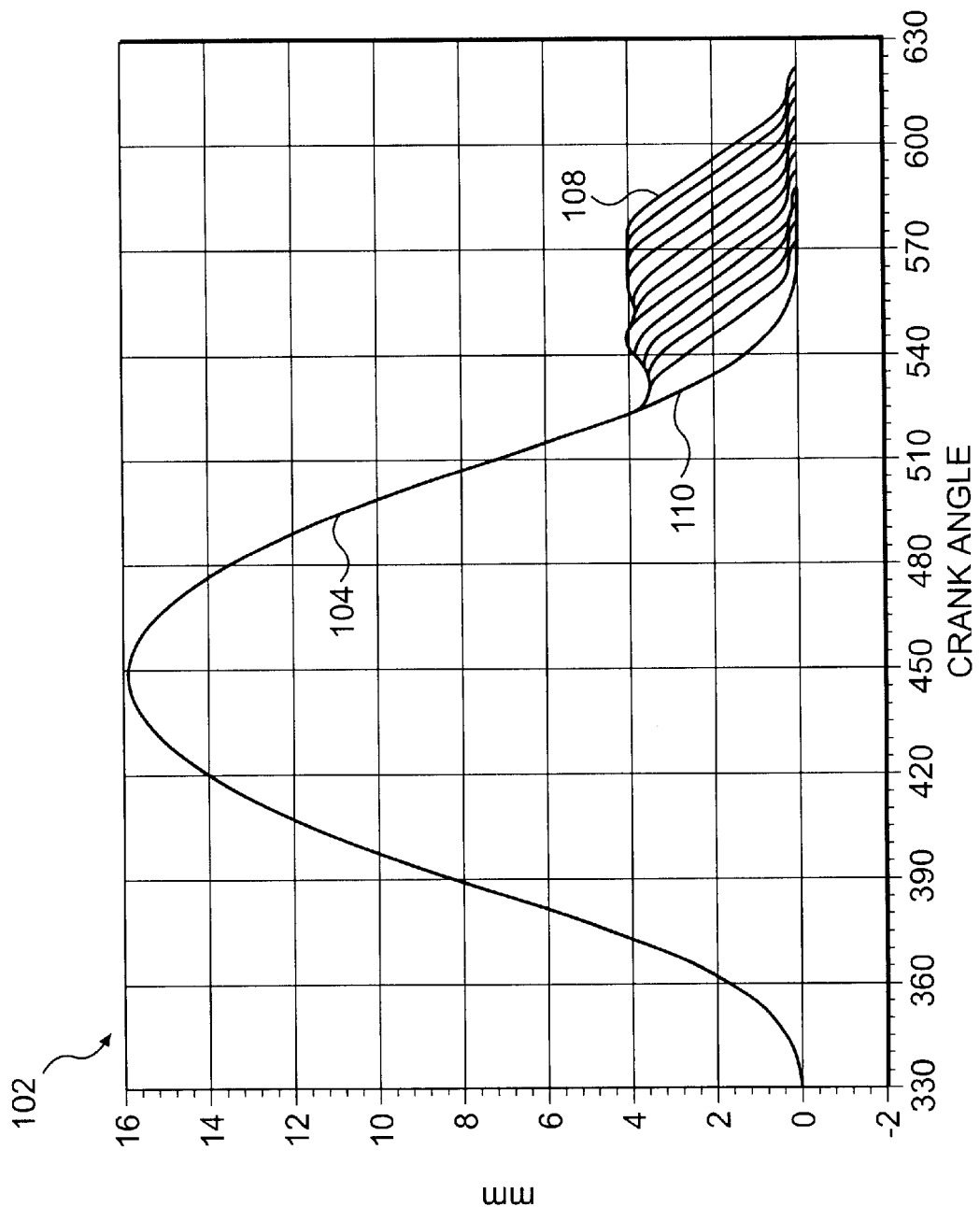
FIG. 5 is a graphic illustration of an exemplary intake valve actuation in accordance with the present invention.

Controller 100 may control valve actuation assembly 44 by transmitting a signal, such as, for example, a current, to directional control valve 88. The transmitted signal may result in the selective opening and/or closing of directional control valve 88. If directional control valve 88 is a normally closed valve, the transmitted signal may cause directional control valve 88 to open for a certain period of time. If directional control valve 88 is a normally open valve, the transmitted signal may cause directional control valve to close for a certain period of time. By controlling the opening and closing of directional control valve 88, controller 100 may control the flow of fluid to and from valve actuator 70 and thereby control the engagement of actuator rod 78 with rocker arm 64 to delay the closing of intake valve 32 for a predetermined period. An exemplary intake valve actuation 104 is illustrated in FIG. 5.

As illustrated in FIGS. 1–4, engine system 10 may include a series of sensors, which are described in greater detail below. Each sensor is configured to monitor a particular operating parameter of engine 20. One skilled in the art may recognize that alternative sensors may be used with engine system 10 to monitor other operating parameters of engine 20.

As shown in FIG. 1, an intake sensor 16 may be disposed in intake passageway 13. Intake sensor 16 may be configured to sense, for example, the pressure of the intake air, the temperature of the intake air, and/or the mass flow rate of the intake air. Intake sensor 16 may be any type of sensor readily apparent to one skilled in the art as capable of sensing these types of parameters and may be disposed at any point along intake passageway 13.

As also shown in FIG. 1, at least one engine sensor 18 is operatively connected with engine 20. Engine sensor 18 may be any type of sensor commonly used to monitor an operating parameter of engine 20. For example, engine sensor 18 may be configured to sense the load on engine 20, the amount of fuel being supplied to engine 20, the rotational speed of engine 20, the pressure within one or more cylinders 22, the rotational angle of crankshaft 27, or any other commonly sensed operating parameter. Engine sensor 18 may be any type of sensor readily apparent to one skilled in the art as capable of sensing these types of engine operating parameters.

Memory 101 of controller 100 may store information related to the operation of engine 20 in the form of a "map." For the purposes of the present disclosure, the term "map" is intended to include any electronic storage structure for storing information related to the operation of the engine, such as, for example, data tables, look-up tables, graphs, or any other electronic storage format readily apparent to one skilled in the art. These maps may define optimal engine operating characteristics as a function of engine operating parameters. For example, memory 101 may store a map that defines an optimal valve actuation period for a particular engine speed and load. Similarly, memory 101 may store a map that defines an optimal fuel delivery rate for a particular engine speed and load. Memory 101 may also store a map that defines an optimal air fuel ratio for a particular engine speed and load.

Memory 101 may further store a braking map that defines the optimal valve actuation period for the intake valves when the engine is operating in an engine braking mode. The braking map may define the optimal valve actuation period for a particular engine speed and intake air pressure. As described in greater detail below, this map may provide the optimal valve actuation period to obtain the greatest benefits from the engine braking.

Memory 101 may store different versions or variations on each of these maps. For example, memory 101 may store one valve actuation period map that provides optimal operating characteristics for steady state engine operation. Memory 101 may store a second valve actuation period map that provides optimal operating characteristics for transient conditions, where the engine load and/or the engine speed are changing. One skilled in the art may recognize that memory 101 may store additional maps or other variations that define other engine operating characteristics based on these, or other, operating parameters.

Figure 6:
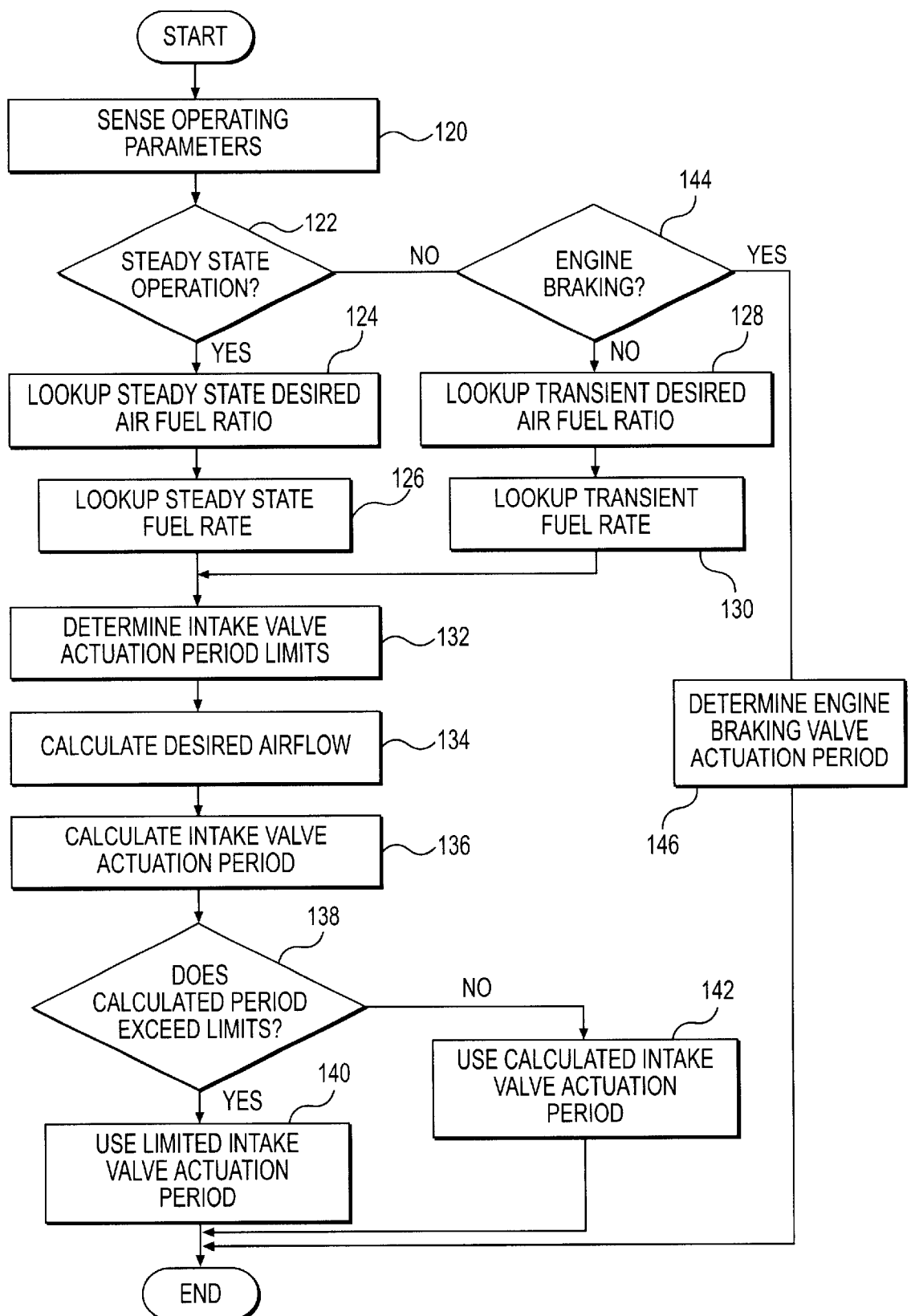
FIG. 6 is a flowchart illustrating an exemplary method for controlling a variable valve actuation system in accordance with the present invention.

Controller 100 may use the information provided by the sensors to access the maps stored in memory 101 to identify an optimal intake valve actuation period for the current engine operating conditions. The flowchart of FIG. 6 illustrates an exemplary method of determining an optimal intake valve actuation period.

INDUSTRIAL APPLICABILITY

Controller 100 may be adapted to operate valve actuator 70 to implement a late intake type Miller cycle in engine 20. When operating under the late intake Miller cycle, controller 100 operates valve actuator 70 to delay the closing of intake valve 32 from a conventional closing, where the closing substantially coincides with the end of an intake stroke, to a delayed closing, where intake valve 32 is held open for a predetermined portion of a compression stroke. The duration of the intake valve actuation period may be determined based on the current operating conditions of engine 20.

As described above, intake cam assembly 52 controls the initial actuation timing of intake valves 32 and exhaust cam assembly 53 controls the actuation timing of exhaust valves 34. The shape of intake cam 60 may cause intake valves 32 to lift from valve seats 50 as piston 24 is moving from a top-dead-center position to a bottom-dead-center position in an intake stroke. The shape of exhaust cam 59 may cause exhaust valves 32 to lift from valve seats 50 when piston 24 is moving from a bottom-dead-center position to a top-dead-center position in an exhaust stroke.

Valve actuator 70 may be used to delay the closing of intake valves 32. As intake cam 60 and push rod 61 start to pivot rocker arm 64, controller 100 ensures control valve 82 and directional control valve 88 are in an open position. This allows pressurized fluid to flow from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. Fluid supply system 79 may be configured to provide a sufficient flow of fluid to actuator chamber 76 to ensure that actuator chamber 76 is filled with fluid before cam 60 returns intake valve 32 to the closed position.

Controller 100 may actuate valve actuator 70 by closing directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, valve actuator 70 will hold intake valves 32 in the open position, independently of the action of cam assembly 52.

Controller 100 may disengage valve actuator 70 to allow intake valves 32 to close by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position.

As illustrated in FIG. 5, operation of valve actuator 70 may extend intake valve actuation 104 from a conventional closing 110 to a delayed closing 108. The period, or duration, of the extended intake valve actuation may be measured in terms of the angle of rotation of crankshaft 27, as a function of time, or in any other manner readily apparent to one skilled in the art. When implementing a late intake type Miller cycle, the extended intake valve actuation period may be between about 0° and 120° crankshaft rotation.

Controller 100 may vary the intake valve actuation period based upon the operating conditions that engine 20 is experiencing. For example, when engine 20 is operating in a steady state condition and is experiencing a light load, the optimal duration of the valve actuation period may be shorter than when engine 20 is operating under a steady state condition and is experiencing an increased load, such as a heavy load acceleration. When engine 20 is operating in a steady state condition, the optimal duration of the valve actuation period may increase as the load on the engine increases.

The length of the intake valve actuation period may impact the magnitude of the compression ratio within cylinder 22. The closing of intake valves 32 will seal cylinder 22 to prevent gases from entering or exiting cylinder 22. A maximum amount of gas may be sealed in cylinder 22 when the closing of intake valves 32 coincides with piston 24 being at or near a bottom-dead-center position at the end of an intake stroke. Accordingly, this conventional closing of intake valves 32 may result in a greater compression ratio within cylinder 22 than a delayed closing, where intake valves 32 are closed after piston 24 has completed a portion of a compression stroke.

In one exemplary method, controller 100 may determine the valve actuation period by sensing the current engine speed and load and accessing a map stored in memory 101. The map may set forth the desired valve actuation period for a series of different engine speeds and loads. Based on the information provided in this map, controller 100 may control valve actuator 70 to achieve the desired valve actuation period.

An alternative method of determining the intake valve actuation period is illustrated in the flowchart of FIG. 6. One or more operating parameters of engine 20 are sensed. (Step 120). For example, controller 100 may receive an indication of the engine speed and the load from engine sensor(s) 18 and an indication of the intake air pressure and/or intake air temperature from intake sensor 16.

Based on the operating parameter(s) of engine 20, controller 100 determines if engine 20 is operating in a steady state condition. (Step 122). Controller 100 may make this determination based on a comparison between the current values of the sensed operating parameters and previous values of the operating parameters. For example, a relatively constant engine speed and/or engine load may indicate that engine 20 is operating under steady state conditions. One skilled in the art will recognize that various parameters and analysis may be used to make this determination.

If engine 20 is not operating in a steady state condition, controller 100 may determine if engine 20 is operating in a transient condition or in another condition, such as, for example, an engine braking mode. (Step 144). Controller 100 may make this determination based on the sensed operating parameters. For example, an increase in the engine speed or engine load may indicate that engine 20 is experiencing a transient condition. A decrease in the engine load or requested fuel supply to the engine and/or a signal from the operator, such as a depression of a brake pedal, may indicate that the engine is operating in an engine braking mode. One skilled in the art will recognize that various parameters and analysis may also be used to make this determination.

Controller 100 may determine the desired air fuel ratio and the desired fuel rate for the current operating conditions. If engine 20 is operating in a steady state mode, controller 100 may access maps that define the optimal air fuel ratio and fuel rate for the current steady state conditions. (Steps 124 and 126). Alternatively, if engine 20 is operating in a transient condition, controller 100 may access maps that define the optimal air fuel ratio and fuel rate for the current transient operating conditions. If engine 20 is operating in an engine braking mode, controller 100 may disable the fuel injection system or otherwise prevent the injection of fuel into cylinder 22.

If engine 20 is operating in a positive power mode, i.e. a steady state condition or a transient condition, controller 100 may then determine if there are any limits on the valve actuation period. (Step 132). The valve actuation period may be limited to control the amount of emissions generated by engine 20 and/or to prevent damage to engine 20. A significant decrease in the valve actuation period may result in an increase in the compression ratio and maximum pressure within each cylinder 22. The increase in pressure in each cylinder 22 may damage engine 20.

Any such limitations on the valve actuation period may be stored in a map in memory 101. The map may be based on engine parameters, such as engine speed and engine load, or any other conditions apparent on one skilled in the art. Controller 100 may access this map to determine the limits on the valve actuation period for the current operating conditions of engine 20.

Controller 100 also calculates the desired airflow for the positive power operating conditions. (Step 134). The desired airflow may be calculated by multiplying the fuel rate (as determined in step 126 or step 130) by the air fuel ratio (as determined in step 124 or step 128).

Controller 100 may then calculate the intake valve actuation period for the particular positive power operating condition. (Step 136). The intake valve actuation period may be expressed as a function of the engine speed (ES), the intake air pressure (IP), and the desired airflow (AF). For example, the intake valve actuation period (P) may be determined by the following equation:

$$P = A + B(ES) + C(ES)^2 + D(IP) + E(IP)^2 + F(AF) + G(AF)^2 + H(ES)(IP)(AF)$$

Where A, B, C, D, E, F, G, and H are constants. For example, the values of these constants may be as follows: A=342.03; B=−0.213; C=6.27E−5; D=−1.215; E=0.00141; F=12.14; G=−0.0558; and H=−5.27E−1.

The above formula will yield an intake valve actuation period, P, that is expressed in terms of an engine crank angle. The determined crank angle may represent the angle at which the current to directional control valve 88 should be terminated to open directional control valve 88 and release valve actuator 70. Alternatively, the determined crank angle may represent the angle at which intake valve actuator 70 should be returned to the closed position. In the latter example, controller 100 may then determine the engine crank angle at which to terminate the current to directional control valve 88 based on a constant that is indicative of the time required for the intake valve 32 to close after the current to directional control valve 88 has been terminated. One skilled in the art may recognize that different formulas and/or constants may be developed to present different representations of the valve actuation period. For example, valve actuation period may be expressed as an amount of a rotation of crankshaft or a time period.

Controller 100 may then compare the calculated valve actuation period with any limits on the valve actuation period. (Step 138). If the calculated valve actuation period would exceed any limitations and subject engine 20 to possible damage, controller 100 will use the limited valve actuation period, as determined in Step 132. (Step 140). If the calculated valve actuation period would not exceed any limitation, controller 100 will use the calculated valve actuation period. (Step 142).

If engine 20 is operating in an engine braking mode where valve 93 is closed, controller 100 may determine the optimal intake valve actuation period for the engine braking mode. (Step 146). The greatest braking benefit may be obtained by adjusting the intake valve actuation period to maximize the compression ratio in cylinder 22 before opening exhaust valves 34 to release the compressed gases. The greatest compression ratio may be obtained by adjusting the intake valve actuation period to follow the conventional closing defined by the shape of intake cam 60, i.e. where intake valves 32 are closed when piston 24 is at or near the bottom-dead-center position at the end of an intake stroke.

However, an excessive compression ratio in cylinder 22 may damage one or more engine components. To prevent this damage, controller 100 may adjust the intake valve actuation period based on current operating conditions to limit the maximum compression ratio in cylinder 22. For example, controller 100 may adjust the intake valve actuation period to optimize the braking performance without incurring an excessive pressure when the intake air pressure, the intake air temperature, or the engine speed changes. The optimal intake valve actuation period for each different intake air pressure, intake air temperature, and/or engine speed may be stored in memory 101 in the "braking map." Thus, controller 100 may, for example, use the sensed engine speed and intake air pressure to access the braking map determine the optimal intake valve actuation period.

In addition to preventing engine damage, controlling the intake valve actuation period during braking operation may also reduce the costs associated with designing and manufacturing an internal combustion engine. For example, many changes in engine design, such as a change in the profile of an intake cam profile or an exhaust cam profile, may be compensated for by updating the "braking map" stored in memory 101. This may avoid the need to redesign engine brake components each time a cam profile changes as the same engine brake component may be used on different engines. Accordingly, the number of engine brake hardware configurations that must be maintained in inventory may be reduced. In addition, the development and tooling expenses associated with manufacturing the engine brake components may be reduced.

Once the desired valve actuation period is determined, controller 100 may then control directional control valve 88 to actuate valve actuator 70 to achieve the desired valve actuation period. Controller 100 may continuously monitor the operating parameters of engine 20 and adjust the valve actuation period accordingly. In this manner, controller 100 may optimize the intake valve actuation period to improve the overall performance of engine 20.

As will be apparent from the foregoing description, the present invention provides a method and system for controlling a variable valve actuation assembly for an internal combustion engine. The valve actuation period may be adjusted to optimize the performance of the engine based upon the particular operational mode of the engine. For example, when the engine is operating in an engine braking mode, the valve actuation period of the engine may be adjusted to maximize the benefit of the engine braking based on sensed engine speed and intake air pressure values. The valve actuation period may be further adjusted to prevent damaging the engine, such as may occur if the engine is exposed to consistently high compression ratios.

It will be apparent to those skilled in the art that various modifications and variations can be made in the system and method of the present invention without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of controlling a valve actuation system for an engine, comprising:
   operating an intake cam assembly to move an intake valve between a first position where the intake valve blocks a flow of fluid relative to a cylinder and a second position where the intake valve allows a flow of fluid relative to the cylinder;
   operating an exhaust cam assembly to move an exhaust valve between a first position where the exhaust valve blocks a flow of fluid and a second position where the exhaust valve allows a flow of fluid;
   operating an engine brake to selectively move the exhaust valve from the first position towards the second position when a piston is at or near a top-dead-center position of a compression stroke;
   sensing at least one operating parameter of the engine;
   determining a desired intake valve actuation period based on the at least one operating parameter;
   operating a valve actuator to selectively prevent the intake valve from returning to the first position in response to operation of the intake cam assembly; and
   releasing the valve actuator to allow the intake valve to return to the first position at the end of the determined valve actuation period.

2. The method of claim 1, further including increasing the pressure of air provided to the cylinder.

3. The method of claim 2, wherein the at least one operating parameter of the engine is the pressure of the air provided to the cylinder.

4. The method of claim 1, wherein the at least one operating parameter of the engine is a speed of the engine.

5. The method of claim 1, further including accessing a map defining a relationship between the at least one operating parameter and a valve actuation period to determine the desired valve actuation period.

6. The method of claim 5, wherein the desired valve actuation period is adapted to achieve a desired compression ratio in the cylinder.

7. The method of claim 1, wherein the desired valve actuation period is determined as a function of an engine speed and an intake air pressure.

8. The method of claim 1, wherein the desired valve actuation period extends the closing of the intake valve by a predetermined number of degrees of a rotation of a crankshaft.

9. A valve actuation system for an engine, comprising:
   an intake valve moveable between a first position where the intake valve prevents a flow of fluid and a second position where the intake valve allows a flow of fluid;
   an intake cam assembly connected to the intake valve to move the intake valve between the first position and the second position;
   an exhaust valve moveable between a first position where the exhaust valve prevents a flow of fluid and a second position where the exhaust valve allows a flow of fluid;
   an exhaust cam assembly connected to the exhaust valve to move the exhaust valve between the first position and the second position;
   a brake actuator adapted to operatively engage the exhaust valve and to move the exhaust valve from the first position towards the second position;
   a valve actuator adapted to operatively engage the intake valve and to prevent the intake valve from returning to the first position;
   a sensor operable to sense an operating parameter of the engine; and
   a controller operable to determine a valve actuation period based on the sensed operating parameter of the engine and to actuate the valve actuator to prevent the intake valve from returning to the first position for the determined valve actuation period.

10. The system of claim 9, wherein the controller includes a memory storing a map defining a relationship between the at least one operating parameter and the valve actuation period.

11. The system of claim 10, wherein the map defines a relationship between an engine speed, an intake air pressure, and the valve actuation period.

12. The system of claim 11, wherein the map defines the valve actuation period as a function of the engine speed and the intake air pressure to optimize the operation of the brake actuator.

13. The system of claim 9, wherein the sensor is adapted to sense one of an intake air pressure and a speed of the engine.

14. The system of claim 13, further including a second sensor adapted to sense the other of the intake air pressure and the speed of the engine.

15. An engine, comprising:
   an engine block defining at least one cylinder;
   a piston slidably disposed within the at least one cylinder to reciprocate between a bottom-dead-center position and a top-dead-center position;
   an intake valve moveable between a first position where the intake valve prevents a flow of fluid to the at least one cylinder and a second position where the intake valve allows a flow of fluid to the at least one cylinder;
   an intake cam assembly connected to the intake valve to move the intake valve between the first position and the second position;

an exhaust valve moveable between a first position where the exhaust valve prevents a flow of fluid and a second position where the exhaust valve allows a flow of fluid;

an exhaust cam assembly connected to the exhaust valve to move the exhaust valve between the first position and the second position;

a brake actuator adapted to operatively engage the exhaust valve and to move the exhaust valve from the first position towards the second position when the piston is approaching the top-dead-center position in a compression stroke;

a valve actuator adapted to operatively engage the intake valve and to prevent the intake valve from returning to the first position;

a sensor operable to sense an operating parameter of the engine; and a controller operable to determine a valve actuation period based on the sensed operating parameter of the engine and to actuate the valve actuator to prevent the intake valve from returning to the first position for the determined valve actuation period.

16. The engine of claim 15, further including at least one turbocharger adapted to increase the pressure of a flow of air provided to the at least one cylinder.

17. The engine of claim 15, wherein the controller includes a memory storing a map defining a relationship between an engine speed, an intake air pressure, and the valve actuation period.

18. The engine of claim 17, wherein the map defines the valve actuation period as a function of the engine speed and the intake air pressure to optimize the operation of the brake actuator.

19. The engine of claim 15, wherein the sensor is adapted to sense one of an intake air pressure and a speed of the engine.

20. The engine of claim 19, further including a second sensor adapted to sense the other of the intake air pressure and the speed of the engine.

* * * * *